US007991531B2

(12) United States Patent
Gowan et al.

(10) Patent No.: US 7,991,531 B2
(45) Date of Patent: *Aug. 2, 2011

(54) ANTISKID CONTROL UNIT AND DATA COLLECTION SYSTEM FOR VEHICLE BRAKING SYSTEM

(75) Inventors: John Gowan, Edmonds, WA (US); Gary DeVlieg, Bellevue, WA (US)

(73) Assignee: Hydro-Aire, Inc., Burbank, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/860,597

(22) Filed: Aug. 20, 2010

(65) Prior Publication Data

US 2010/0315219 A1     Dec. 16, 2010

Related U.S. Application Data

(63) Continuation of application No. 12/356,972, filed on Jan. 21, 2009, now Pat. No. 7,805,233, which is a continuation of application No. 10/841,257, filed on May 6, 2004, now Pat. No. 7,489,996.

(51) Int. Cl.
*B60T 8/68* (2006.01)
*B64C 27/22* (2006.01)

(52) U.S. Cl. ............. 701/71; 701/70; 701/82; 303/176; 303/170; 188/181 R; 188/264 D; 324/173

(58) Field of Classification Search ............ 701/70, 701/71, 82; 324/173; 340/442; 188/181 R, 188/264 D
See application file for complete search history.

(56) References Cited

U.S. PATENT DOCUMENTS

| 2,954,262 | A |   | 9/1960 | Osborne et al. |
| 3,600,617 | A |   | 8/1971 | Frayer |
| 3,640,586 | A |   | 2/1972 | Kohler |
| 4,216,419 | A |   | 8/1980 | van Dam et al. |
| 4,593,555 | A |   | 6/1986 | Krutz et al. |
| 4,822,113 | A |   | 4/1989 | Amberg et al. |
| 5,190,247 | A |   | 3/1993 | Le Chatelier |
| 5,285,154 | A |   | 2/1994 | Burreson |
| 5,351,004 | A |   | 9/1994 | Daniels et al. |
| 5,524,034 | A | * | 6/1996 | Srygley et al. .................. 377/15 |
| 5,700,072 | A |   | 12/1997 | Cook et al. |
| 5,707,118 | A |   | 1/1998 | Kolberg et al. |

(Continued)

FOREIGN PATENT DOCUMENTS

WO     01/89896 A1     11/2001

(Continued)

*Primary Examiner* — Thomas G Black
*Assistant Examiner* — Wae Louie
(74) *Attorney, Agent, or Firm* — Fulwider Patton LLP

(57) ABSTRACT

A wheel speed transducer including a magnetic device associated with a wheel and a sensor device associated with the axle of the wheel provides data indicative of the velocity of the wheel. A processor located at the axle receives the wheel speed data and processes it to perform antiskid control functions. The velocity data is stored in a data concentrator also associated with the axle. A tire pressure sensor, a brake temperature sensor and a brake torque sensor, each associated with the wheel, send data to the processor at the axle, for storage in the data concentrator. A transmitting antenna associated with the axle and in communication with the data concentrator transmits stored data to a receiving antenna associated with the wheel. A data port at the wheel and in communication with the receiving antenna provides an interface to an external device for receiving the data.

7 Claims, 3 Drawing Sheets

U.S. PATENT DOCUMENTS

| | | | |
|---|---|---|---|
| 5,798,689 A | 8/1998 | Huang | |
| 5,968,106 A | 10/1999 | DeVlieg et al. | |
| 6,132,016 A | 10/2000 | Salamat et al. | |
| 6,183,051 B1 | 2/2001 | Hill et al. | |
| 6,241,325 B1 | 6/2001 | Gowan et al. | |
| 6,538,426 B1 | 3/2003 | Enrietto et al. | |
| 6,615,958 B1 | 9/2003 | Baden | |
| 6,820,946 B2 | 11/2004 | Salamat et al. | |
| 6,902,136 B2 * | 6/2005 | Mackness | 244/100 R |
| 6,959,593 B2 * | 11/2005 | Mancosu et al. | 73/146 |
| 7,168,308 B2 * | 1/2007 | Mancosu et al. | 73/146 |
| 7,341,321 B2 * | 3/2008 | Takahashi et al. | 303/168 |
| 7,489,996 B2 * | 2/2009 | Gowan et al. | 701/71 |
| 7,490,793 B2 * | 2/2009 | Mackness | 244/100 R |
| 7,565,941 B2 * | 7/2009 | Cunningham | 180/167 |
| 7,805,233 B2 * | 9/2010 | Gowan et al. | 701/71 |
| 2002/0077752 A1 | 6/2002 | Burreson et al. | |
| 2003/0093188 A1 * | 5/2003 | Morita et al. | 701/1 |
| 2003/0111895 A1 | 6/2003 | Salamat et al. | |
| 2003/0201879 A1 * | 10/2003 | Munch et al. | 340/442 |
| 2003/0234578 A1 * | 12/2003 | Takahashi et al. | 303/168 |
| 2003/0234722 A1 * | 12/2003 | Lonsdale et al. | 340/445 |
| 2004/0075022 A1 | 4/2004 | MacKness et al. | |
| 2004/0217853 A1 * | 11/2004 | Dunbridge et al. | 340/444 |
| 2005/0039531 A1 | 2/2005 | Pradier | |
| 2005/0081973 A1 | 4/2005 | Marin-Martinod | |
| 2006/0290579 A1 * | 12/2006 | Forster | 343/713 |
| 2008/0133100 A1 * | 6/2008 | Takahashi et al. | 701/74 |
| 2009/0132140 A1 * | 5/2009 | Gowan et al. | 701/71 |

FOREIGN PATENT DOCUMENTS

WO 02/23152 A1 3/2002

* cited by examiner

ANTISKID CONTROL UNIT AND DATA COLLECTION SYSTEM FOR VEHICLE BRAKING SYSTEM

RELATED APPLICATIONS

This application is a continuation of Ser. No. 12/356,972, filed Jan. 21, 2009, now U.S. Pat. No. 7,805,233, which is a continuation of Ser. No. 10/841,257, filed May 6, 2004, now U.S. Pat. No. 7,489,996.

BACKGROUND OF THE INVENTION

1. Field of the Invention

The invention relates generally to vehicle braking systems, and more particularly, to an antiskid system that controls the deceleration of the vehicle wheels and collects information related to the operation of the vehicle braking system.

2. Description of Related Art

Antiskid braking systems have been provided on commercial and large turbine aircraft to aid in the deceleration of aircraft upon landing. Modern antiskid systems typically optimize braking efficiency by adapting to runway conditions and other factors affecting braking to maximize deceleration, corresponding to the level of brake pressure selected by the pilot. In conventional antiskid braking systems, brakes are typically applied mechanically through a metering valve by the pilot. As soon as the wheel brake pressure approaches the skid level, such as when an initial skid is detected, the antiskid control system is initialized.

The electronic control subsystems of an antiskid control system are typically located in the electronic equipment bays of the aircraft along with various other aircraft electronic systems. Though located a distance from the landing gear, operation of a typical antiskid control system relies on measurements of sensors located within the landing gear. Once such sensor is a wheel speed transducer. The wheel speed transducer provides a signal indicative of the velocity of the wheel. Measurements from the wheel speed transducer are fed to the antiskid control system through a complex and lengthy aircraft wiring network where they are processed by an antiskid control unit to produce a wheel velocity signal. The wheel velocity signal is further processed to control an antiskid valve located downstream from the metering valve.

Other sensors may be located within the landing gear to assist in the antiskid control process. For example, an accelerometer may be used to adjust the reference velocity of the antiskid control system to make the reference velocity immune against wheel speed variation caused by gear walk or truck pitch. In addition to antiskid control system related sensors, additional sensors, such as brake temperature sensors, tire pressure sensors and torque sensors, may be located within the landing gear. These sensors provide measurements beneficial in analyzing the condition of landing gear components to determine, for example, the degree of tire wear and brake pad wear. Measurements from these sensors may also prove useful in monitoring pilot performance. For example, insight into a particular pilot's landing performance may be gathered from brake temperature and wheel torque data. All of this data is useful in monitoring the life cycle of braking system and landing gear components and evaluating their cost of operation.

Data provided by these sensors is typically recorded in a data concentrator located in an electronic equipment bay a substantial distance from the wheel. As such, data from these sensors must also pass through the lengthy aircraft wiring network. The need for great lengths of wire from the sensors to both the antiskid control unit and the data concentrator tends to increase the cost and weight of the aircraft. Collection of data from the data concentrator requires access to the data output busses of the electronic equipment bays. This is often inconvenient for the landing gear maintenance crew, in that the data concentrator is located a distance from the landing gear itself.

Hence, those skilled in the art have recognized a need for providing an antiskid control system and data concentrator that is less dependent on complex and lengthy aircraft wiring and is easily accessible to landing gear maintenance personnel. The invention fulfills these needs and others.

SUMMARY OF THE INVENTION

Briefly, and in general terms, the invention is directed to a system for collecting information related to the operation of a wheel on an axle of a moving vehicle. The system includes a processor that is associated with the axle and is either mounted within the axle or around the outside of the axle. The system also includes a wheel speed transducer that is adapted to provide wheel speed data to the processor. A data concentrator, also located either within the axle or around the outside of the axle, stores wheel speed data over a period of time. The system further includes means for downloading the operation information including the wheel speed data from the data concentrator.

In a detailed facet of the system, the wheel speed transducer includes a magnetic device associated with the wheel and a sensor device associated with the axle. The sensor device is adapted to sense the magnetic field produced by rotation of the magnetic device and output signals to the processor. As such, the system detects wheel speed without direct contact between rotating and stationary parts. The output signals from the magnetic sensor are wheel speed data signals. These signals are used by the processor to perform antiskid control functions. By positioning the antiskid processor at the axle, as opposed to the electronic equipment bay, and near the wheel speed transducer, the invention substantially reduces antiskid control system cost and weight by eliminating the need for large amounts of aircraft wiring between the transducer and the processor.

In other detailed aspects of the invention, the system includes one or more additional sensors for providing additional operation information data to the processor for storage in the data concentrator. For example, a tire pressure sensor may be included to provide tire pressure data. Such a tire pressure sensor may include a transmitting device with a pressure sensor at one end in communication with the tire interior and a transmitting antenna at the other end for transmitting pressure sensor signals. The sensor may further include a receiving device in communication with the processor that is adapted to receive signals from the transmitting antenna. In a more detailed aspect, the transmitting device is associated with the axle while the receiving device is associated with the wheel. Using a transmitter and receiver pair as such allows for the passing of data from within the rotating wheel to the processor within the stationary axle. Other possible sensors for use with the system include brake temperature sensors and brake torque sensors. Once again, by positioning the processor at the axle and near the pressure, temperature and torque sensors, the invention substantially reduces system cost and weight by eliminating the need for large amounts of aircraft wiring that typically run between the sensors and the processor.

In another aspect, the means for downloading the operation information from the data concentrator includes a receiving antenna at the wheel and a transmitting antenna at the axle. The transmitting antenna is in communication with the data concentrator and transmits the operation information data to the receiving antenna which is in communication with a data port. An external device may be connected to the data port in order to download the data from the data concentrator. Access to the operation information data directly at the wheel, provides for more efficient and convenient data collection.

These and other aspects and advantages of the invention will become apparent from the following detailed description and the accompanying drawings which illustrate by way of example the features of the invention.

DETAILED DESCRIPTION OF THE PREFERRED EMBODIMENTS

Figure 1:
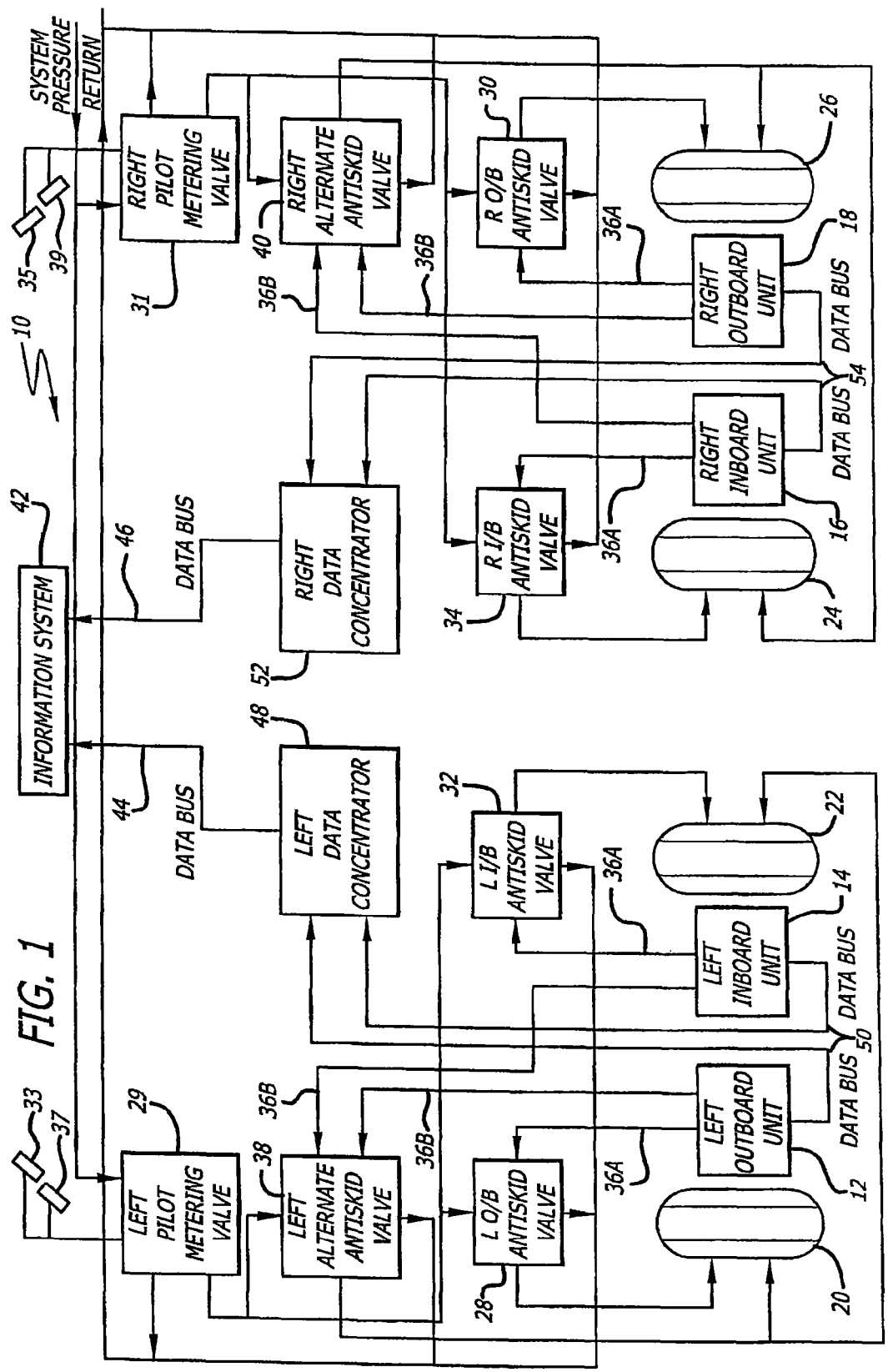
FIG. 1 is a schematic block diagram of a vehicle antiskid system configured in accordance with the invention including antiskid control units at the vehicle axle and data concentrators for storing system operation data.

Referring now to the drawings, wherein the reference numerals denote like or corresponding parts throughout the figures, and particularly to FIG. 1, there is shown a schematic block diagram of an antiskid system 10 configured in accordance with the present invention. Although shown within the context of an aircraft landing gear, use of the system 10 is not limited to aircraft and may be used in other non-aircraft vehicles such as trains, trucks and automobiles.

As shown in FIG. 1, the antiskid system 10 includes a left outboard antiskid unit 12, a left inboard antiskid unit 14, a right inboard antiskid unit 16 and a right outboard antiskid unit 18. Each antiskid unit 12, 14, 16, 18 is associated with one of the four wheels 20, 22, 24, 26 of the aircraft landing gear. Details of the antiskid units 12, 14, 16, 18 are provided below. The antiskid system 10 also includes left and right outboard antiskid valves 28, 30 and left and right inboard antiskid valves 32, 34. The antiskid valves 28, 30, 32, 34 receive control signals 36a from their respective antiskid unit 12, 14, 16, 18. Based on these control signals 36a, the antiskid valve 28, 30, 32, 34, operating in conjunction with left and right pilot metering valves 29, 31, controls the deceleration of its associated wheel 20, 22, 24, 26. The left and right pilot metering valves 29, 31 are controlled by the left and right pilot pedals 33, 35 and co-pilot pedals 37, 39. Although shown in use with a hydraulic brake system, the antiskid system may be used in conjunction with an electrical brake system.

The system 10 further includes left and right alternate antiskid valves 38, 40. The alternate antiskid valves 38, 40 are installed on a separate hydraulic system to control brake pressure in the event the normal brake hydraulic system fails. If the normal brake system fails, the alternate brake system is activated. The left alternate antiskid valve 38 receives control signals 36b from each of the left side antiskid units 12, 14 while the right alternate antiskid valve 40 receives control signals 36b from each of the right side antiskid units 16, 18. Left and right 28 Vdc power supplies (not shown) power the left and right antiskid units 12, 14, 16, 18. The antiskid units 12, 14, 16, 18 transmit the same antiskid valve command to both the normal and the alternate antiskid valves.

The antiskid system 10 further includes one or more data concentrators 48, 52. The data concentrators 48, 52 include a memory device configured to collect and store wheel operation information from the antiskid units 12, 14, 16, 18. In one configuration, the system 10 includes a left data concentrator 48 for collecting and storing data from the left side antiskid units 12, 14 and a right data concentrator 52 for collecting and storing wheel operation information from the right side antiskid units 16, 18. The data concentrators 48, 52 interface with the antiskid units 12, 14, 16, 18 over respective data buses 50, 54 and with the vehicle information system 42 over respective data buses 44, 46. Data stored in the data concentrators 48, 52 may be obtained through the information system 42. Alternatively, as described in further detail below, data may be accessed through a data port located in the wheel.

In a preferred embodiment of the invention, the data concentrators 48, 52 are positioned within the axle 56 along with the antiskid units 12, 14, 16, 18. Although shown in FIG. 1 separate from the antiskid units 12, 14, 16, 18, the data concentrators 48, 52 may be incorporated in one of the left and right antiskid units. For example, the left data concentrator 48 may be located within the left outboard antiskid unit 12 while the right data concentrator may be located within the right outboard unit 18. Locating the data concentrators in the outboard antiskid units 12, 18 provides for easy access to the data through a data port on the left and right outboard wheels 20, 26.

Figure 2:
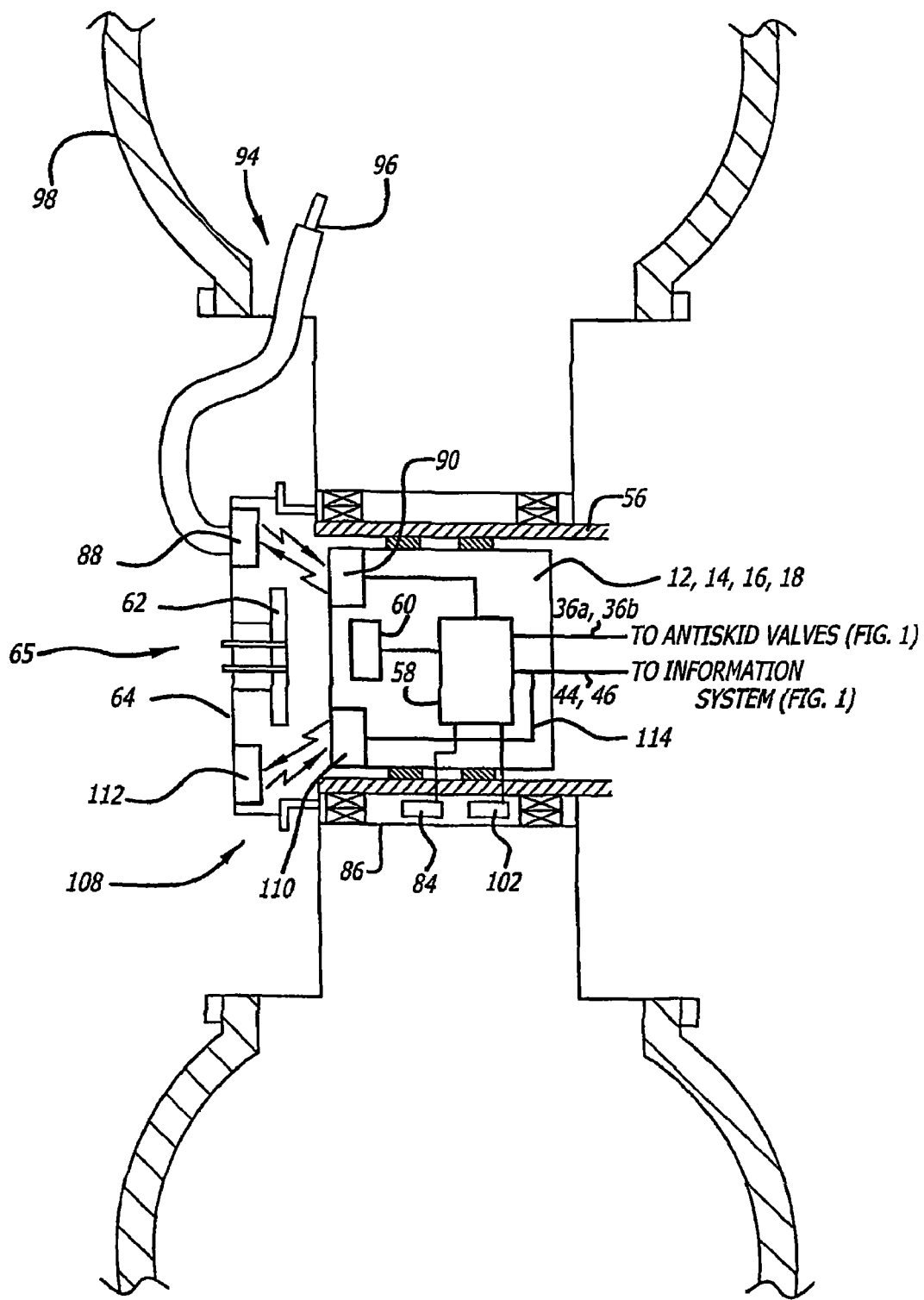
FIG. 2 is a block diagram of the interior of vehicle tire and axle showing a configuration of the antiskid control units of FIG. 1 including various sensors for collecting data related to the operation of the wheel.

With reference to FIG. 2, each antiskid unit 12, 14, 16, 18 is associated with an axle 56 of the aircraft landing gear. For landing gears having hollow axles 56 the antiskid units 12, 14, 16, 18 are mounted within the axle. Alternatively, for solid axles (not shown), the antiskid units 12, 14, 16, 18 may be installed around the outside of the axle and enclosed in a hermitically sealed case. Housed within each antiskid unit 12, 14, 16, 18 is a microprocessor 58 programmed to provide antiskid control functions and data collection functions described further below with reference to FIG. 3.

With continued reference to FIG. 2, also housed within each antiskid unit 12, 14, 16, 18 is a sensor 60 for sensing the magnetic fields from a rotating magnetic device 62 located inside the wheel hubcap 64. The magnetic device 62 and sensor 60 form a wheel speed transducer 65 such as that described in U.S. Pat. No. 6,690,159, titled Position Indicating System, assigned to Eldec Corporation, the disclosure of which is hereby incorporated by reference. The wheel speed transducer 65 detects wheel speed without any direct contact between the rotating magnetic device 62 and the stationary sensor 60 and provides the wheel speed data required by the antiskid control function of the microprocessor 58.

Figure 3:
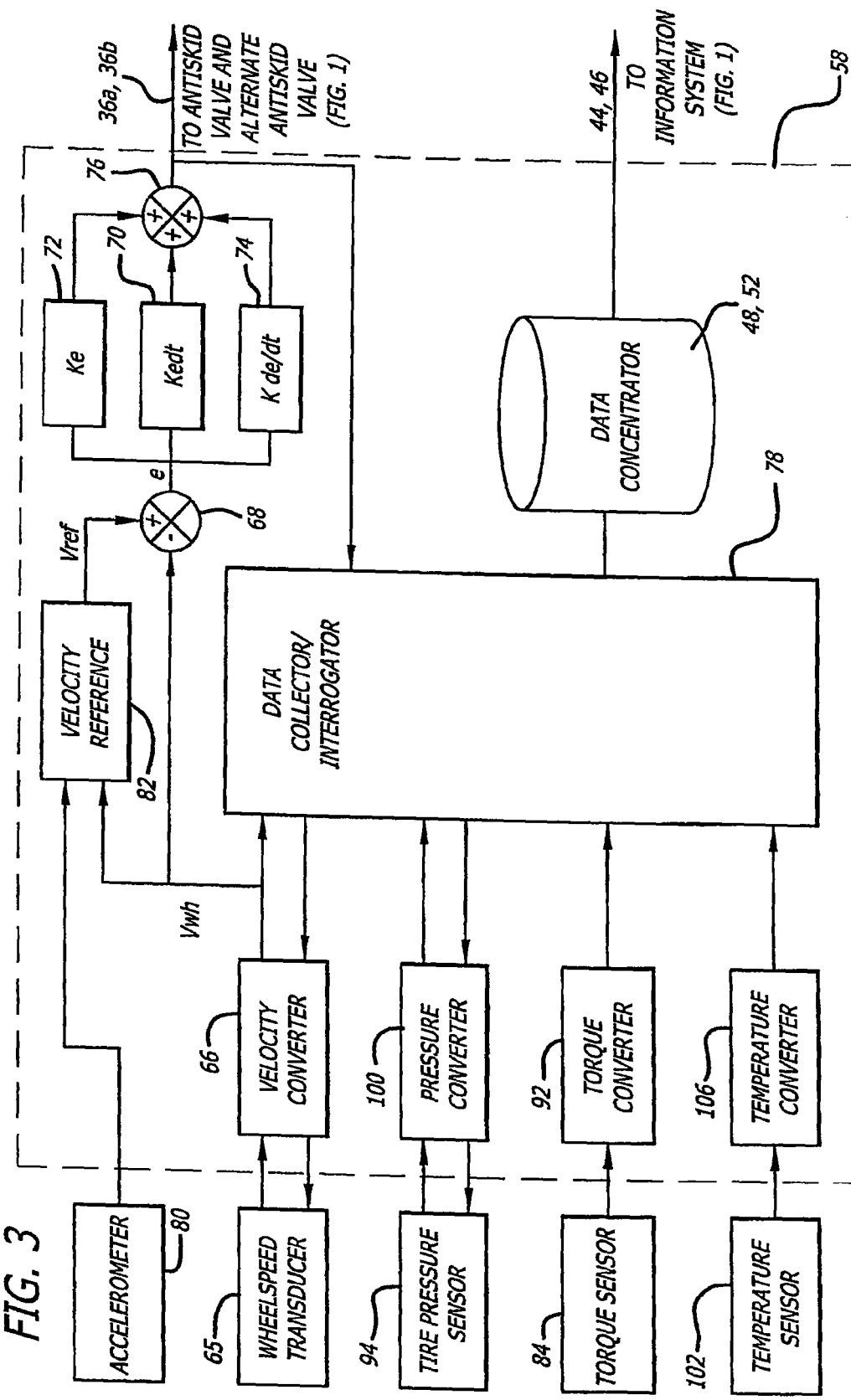
FIG. 3 is a schematic block diagram of antiskid control function and various other sensor functions incorporated in the antiskid control unit of FIGS. 1 and 2.

With reference to FIG. 3, the output of the wheel speed transducer 65 is input to a velocity converter 66 where it is converted to rotary wheel speed data. The output of the velocity converter 66 is compared with a desired reference velocity in velocity comparator 68 to generate wheel velocity error signals indicative of the difference between the wheel velocity signals from each brake wheel and the reference velocity signal 82. The output of the velocity comparator 68 is referred to as slip velocity or velocity error (e). The velocity error signals are adjusted by a pressure bias modulator control means (PBM) integrator 70, the transient control means 72, and compensation network 74, the outputs of which are summed at summing junction 76 to provide an antiskid control signal 36a, 36b. The antiskid control signal 36a, 36b is input to its associated antiskid valve 28, 30, 32, 34 and alternate antiskid valve 38, 40 to thereby control the deceleration of the vehicle. The antiskid control signal 36a, 36b may also be input to a data collector/interrogator 78 which in turn forwards the control signal to the data concentrator 48, 52 for storage.

The data collector/interrogator 78 is programmed to collect data related to the wheel speed by polling the velocity converter 66 during certain times, e.g., during takeoff and landing of the aircraft, time stamping the data and sending it to the data concentrator 48, 52 for storage. In recording the data as a function of time, the unit maintains a record of takeoff and landing characteristics of the braking system and landing gear components and pilot performance. For example, during takeoff, the data provides an indication of the aircraft's acceleration rate and likewise, during landing, the aircraft's deceleration rate.

In another embodiment of the invention, the antiskid units 12, 14, 16, 18 include an accelerometer 80 for measuring the acceleration rate of the axle. The signal from the accelerometer 80 is used to make the antiskid velocity reference 82 (FIG. 3) immune against wheel speed variation caused by gear walk and truck pitch. Data from the accelerometer 80 may also be input to the data collector/interrogator 78.

With reference again to FIG. 2, each wheel has a brake wheel 86 and in another embodiment of the invention, a brake torque sensor 84 interfaces with each brake wheel 86. In a preferred embodiment, the sensor 84 is a linear strain gauge that is commonly available from a number of different sources. The brake torque sensor 84 generates data indicative of the braking torque being applied to the wheel. The sensor 84 is wired directly to the antiskid unit 12, 14, 16, 18 and receives electrical current excitation from the unit. The sensor 84 continuously outputs torque data to the unit for storage at the data concentrator 48, 52. The antiskid unit microprocessor 58 includes a torque converter 92 (FIG. 3) that converts torque data from the torque sensor 84 to brake torque signals.

In another embodiment of the invention, the system includes a tire pressure sensor 94. In one configuration, the pressure sensor 94 is a wireless, passive surface acoustic wave (SAW) sensor 94. The sensor end 96 of the tire pressure sensor 94 is located within the tire 98 and provides data indicative of the air pressure within the tire. This data is sent to the antiskid unit 12, 14, 16, 18 through an RF pulse transmitted by a transmitting antenna 88 located in the hubcap 64. A receiving antenna 90 within the antiskid unit 12, 14, 16, 18 receives the data and forwards it to a pressure converter 100 (FIG. 3) where it is converted to pressure data. The data collector/interrogator 78 polls the pressure sensor 94 to collect pressure data for storage at the data concentrator 48, 52. Polling of the pressure sensor 94 occurs through the transmission of an RF signal from the unit 12, 14, 16, 18 to the pressure sensor 94. This RF signal activates the tire pressure sensor 94.

In an alternate configuration, the pressure sensor 94 includes a wireless, passive application specific integrated circuit (ASIC). The ASIC is attached to a capacitive diaphragm to sense tire pressure. The interrogation pulse from the data collector/interrogator 78 supplies the necessary power to operate the ASIC to sense the tire pressure and return a signal back to the interrogator through the transmitting antenna 88.

In another embodiment of the invention, the system includes a brake temperature sensor 102. The temperature sensor 102 may be a thermocouple sensor that is wired directly to the unit 12, 14, 16, 18. The sensor end of the brake temperature sensor 102 is located at the wheel brake 86 and continuously outputs data indicative of the temperature at the brake. The unit 12, 14, 16, 18 receives the data and forwards it to a temperature converter 106 (FIG. 3) where it is converted to temperature data for storage at the data concentrator 48, 52.

During aircraft landing, the system collects and records antiskid data, including wheel speed data from the wheel speed transducers 65, antiskid valve command signals 36a, 36b and axle acceleration data from the accelerometers 80. The system also collects and records data from the pressure sensors 94, temperature sensors 102 and torque sensors 84, as well as data related to aircraft usage.

Upon touch down of the aircraft, the microprocessor 58 (FIG. 3) within each antiskid unit 12, 14, 16, 18 begins measuring wheel speed data to perform its antiskid control function as previously described. The wheel speed data is continuously measured through the wheel speed transducer 65 as part of this antiskid control function. As part of the data collection function of the system, the data collector/interrogator 78 periodically polls the velocity converter 66 and records the wheel speed data (wh_sp). For example, the wheel speed data may be recorded every second until the aircraft stops. The data collector/interrogator 78 also receives each of the antiskid control signals (ant-skd) for both the normal and alternate valves and records those as a function of time.

Tire pressure (prs) data for each wheel is collected by its associated data collector/interrogator 78 through periodic polling of the respective pressure sensor 94. Torque (trq) and temperature (tmp) data for each wheel is collected through continuous monitoring of the torque sensor 84 and temperature sensor 102 outputs as provided by their associated torque and temperature converters 92, 106.

As previously mentioned, data stored in the left and right data concentrators 48, 52 may be accessed through a data port 108 (FIG. 2) located on the wheel. The data port 108 is a radio frequency (RF) data port which includes a transmitting antenna 110 and a receiving antenna 112. Data from the applicable left and right data concentrator 48, 52 is downloaded to the transmitting antenna 110 over a data bus 114. The data is transmitted to the receiving antenna 112 and downloaded to an external memory device (not shown), e.g., a laptop computer hard drive, interfacing with the data port 108. The aircraft operational data provided by the system can be used by aircraft manufactures and the airline industry to monitor pilot operation and equipment life cycles and to thereby improve their cost of operation. One of the benefits of the system is that it is compatible with any airplane architecture, whether it is a remote data concentrator, an integrated airplane avionics system, or a traditional federated control unit architecture typically found on large commercial transport airplanes.

It will be apparent from the foregoing that while particular forms of the invention have been illustrated and described, various modifications can be made without departing from the spirit and scope of the invention. Accordingly, it is not intended that the invention be limited, except as by the appended claims.

What is claimed is:

1. A system for collecting information related to operation of a wheel of a moving vehicle, the system comprising:
   a wheel mounted on a hollow axle;
   an antiskid unit operative to generate operation information data related to operation of said wheel, said antiskid unit being associated with said hollow axle;
   a data concentrator operatively connected to said antiskid unit and configured to receive and store the operation information data from said antiskid unit, said data concentrator being associated with said hollow axle;
   a transmitting antenna in communication with said data concentrator, said transmitting antenna being configured to transmit the operation information data from said data concentrator, and said transmitting antenna being associated with said hollow axle; and a receiving antenna for downloading the operation information data, said receiving antenna being configured to receive the operation information data from said transmitting antenna, said receiving antenna being associated with said wheel.

2. The system of claim 1, further comprising a wheel speed transducer configured to provide wheel speed data to the antiskid unit, and wherein the operation information data includes the wheel speed data.

3. The system of claim 2, wherein said wheel speed transducer comprises:

a magnetic device associated with the wheel; and a sensor device associated with the axle and configured to sense the magnetic field produced by the magnetic device and output signals to the antiskid unit.

4. The system of claim 3, wherein the sensor device is located within the axle.

5. The system of claim 1, further comprising a tire pressure sensor configured to provide tire pressure data to the antiskid unit, and wherein the operation information data includes the tire pressure.

6. The system of claim 5, wherein the tire pressure sensor comprises:

a transmitting device having a pressure sensor at one end in communication with the tire interior and a transmitting antenna at the other end configured to transmit pressure sensor signals; and a receiving device in communication with the antiskid unit and configured to receive signals from the transmitting antenna.

7. The system of claim 1, further comprising an accelerometer configured to provide acceleration data to the antiskid unit, and wherein the operation information data includes the acceleration data.

* * * * *

UNITED STATES PATENT AND TRADEMARK OFFICE
CERTIFICATE OF CORRECTION

| | | |
|---|---|---|
| PATENT NO. | : 7,991,531 B2 | Page 1 of 1 |
| APPLICATION NO. | : 12/860597 | |
| DATED | : August 2, 2011 | |
| INVENTOR(S) | : John Gowan et al. | |

It is certified that error appears in the above-identified patent and that said Letters Patent is hereby corrected as shown below:

Title page, (75) Inventors: delete "Gary" and insert instead --Garrett H.--.

Signed and Sealed this
Seventh Day of August, 2012

David J. Kappos
*Director of the United States Patent and Trademark Office*